United States Patent
Ward et al.

(10) Patent No.: US 6,804,258 B1
(45) Date of Patent: Oct. 12, 2004

(54) METHOD AND APPARATUS FOR ALLEVIATING CELL PACKING PROBLEMS IN BUNDLED LINK SYSTEMS

(75) Inventors: Kenneth A. Ward, Shrewsbury, MA (US); Domenic Dimeo, Groton, MA (US); Glenn Dearth, Groton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/456,740

(22) Filed: Dec. 7, 1999

(51) Int. Cl.[7] ................................................. H04J 3/24
(52) U.S. Cl. ........................................ 370/474; 370/394
(58) Field of Search ................................. 370/394, 389, 370/465, 470, 474, 476, 472, 395.1

(56) References Cited

U.S. PATENT DOCUMENTS

| | | | | |
|---|---|---|---|---|
| 4,691,314 A | * | 9/1987 | Bergins et al. | |
| 4,999,835 A | * | 3/1991 | Lagoutte | |
| 5,568,477 A | * | 10/1996 | Galand et al. | |
| 5,822,321 A | * | 10/1998 | Petersen et al. | |
| 5,978,375 A | * | 11/1999 | Petersen et al. | |
| 6,212,190 B1 | * | 4/2001 | Mulligan | |
| 6,256,323 B1 | * | 7/2001 | Benayoun et al. | |
| 6,310,893 B1 | * | 10/2001 | Yuan et al. | |
| 6,359,877 B1 | * | 3/2002 | Rathonyi et al. | |

* cited by examiner

Primary Examiner—Ajit Patel
Assistant Examiner—Steve Blount
(74) Attorney, Agent, or Firm—Kudirka & Jobse, LLP

(57) ABSTRACT

In a bundled link system which partitions a data packet into varying size cells, a data packet is partitioned into a stream of cells of which the last two cells are partial cells. When the data has been partitioned so that less than the data required to fill two maximum size cells remains, the remaining data is divided into two cells where the cell size is selected so that each cell is larger than a predetermined minimum size. In a preferred embodiment, the remaining data is equally divided into partial size cells. In particular, in accordance with one embodiment, when there is less than two times the maximum size cell of data remaining to be partitioned in a packet and the remaining data is more than the maximum cell size, then the cell size used for the last two cells is the size of the remaining data divided by two.

12 Claims, 5 Drawing Sheets

METHOD AND APPARATUS FOR ALLEVIATING CELL PACKING PROBLEMS IN BUNDLED LINK SYSTEMS

FIELD OF THE INVENTION

This invention relates to data transmission over packetized data transmission systems and methods and apparatus for increasing performance in bundled link systems.

BACKGROUND OF THE INVENTION

The problem of transferring data from a source to a receiver recurs continuously in data processing systems. For example, such data transfer occurs both over networks on which clients and servers exchange data and over internal computer busses on which CPUs, memories and peripheral units exchange data.

Nodes coupled to a network typically communicate by exchanging messages which comprise discrete packets of data. These packets can be transported over the network with one of a variety of transport techniques. For example, asynchronous transfer mode (ATM) is a relatively new data transport technique in which the network transports and switches short, fixed-length cells. In applications utilizing ATM, data packets to be transported are first broken up into ATM cells, transmitted serially over a data link, and then reassembled at a destination. The header of an ATM cell contains the information used to transport the cell from one node to the next over a switched route which has been previously established by means of a separate signaling channel.

A similar cell-switching arrangement is used in some new internal bus technologies which overcome some of the shortcomings of with conventional shared bus technology. One of these newer bus technologies, called "Next Generation I/O" (NGIO) architecture is a channel oriented, switched point-to-point serial link architecture. The NGIO architecture uses a plurality of "links" or physical connections to connect each I/O controller to a switch. The switch can then connect the I/O controllers to a specialized DMA engine called a "channel adapter" which transfers data between the I/O controllers and the memory. In order to provide extensibility, switches can also be connected to other switches by means of links.

In order to move data packets over a link, specialized hardware breaks each data packet into cells and the cells are transmitted serially from a data source to a data receiver over the link. At the data receiver, the cells are reassembled by other hardware into the complete data packet.

Even with this cell switching technology, data flow is still limited by the serial data rate of a link and there are instances where the throughput of a single link is insufficient. In the NGIO system, a proposed variation called the Multi Link Extension (MLX) permits several serial links can be dynamically associated into a set called a "bundle" which is used to transmit cells in parallel. The bundle exhibits overall increased bandwidth and can be used to match bandwidths between the I/O controllers and the point-to-point switch.

However, with such bundled arrangements, packets with certain sizes cause link packing problems which appear as lost link bandwidth. These problems occur because each packet must be partitioned into cells for transmission. Although each cell may have a varying length or size, conventionally, a packet is conventionally partitioned into cells by using the maximum cell size for all cells but the last cell and filling each cell with packet information. A cell with a less than maximum size is used to accommodate the remainder of the packet. In certain sized packets, for example, packets which have a size equal to the maximum size of a cell plus one byte, this packing arrangement results in a stream of two cells, one of which is full of data and a second which contains only one byte.

Therefore, there is a need to partition data packets in such a manner as to increase link bandwidth.

SUMMARY OF THE INVENTION

In accordance with one illustrative embodiment of the invention, a data packet is partitioned into a stream of cells of which the last two cells are partial cells. When the data has been partitioned so that less than the data required to fill two maximum size cells remains, the remaining data is divided into two cells where the cell size is selected so that each cell is larger than a predetermined minimum size. In a preferred embodiment, the remaining data is equally divided into partial size cells In particular, in accordance with one embodiment, when there is less than two times the maximum size cell of data remaining to be partitioned in a packet and the remaining data is more than the maximum cell size, then the cell size used for the last two cells is the size of the remaining data divided by two.

BRIEF DESCRIPTION OF THE DRAWINGS

The above and further advantages of the invention may be better understood by referring to the following description in conjunction with the accompanying drawings in which.

DETAILED DESCRIPTION

Figure 1:
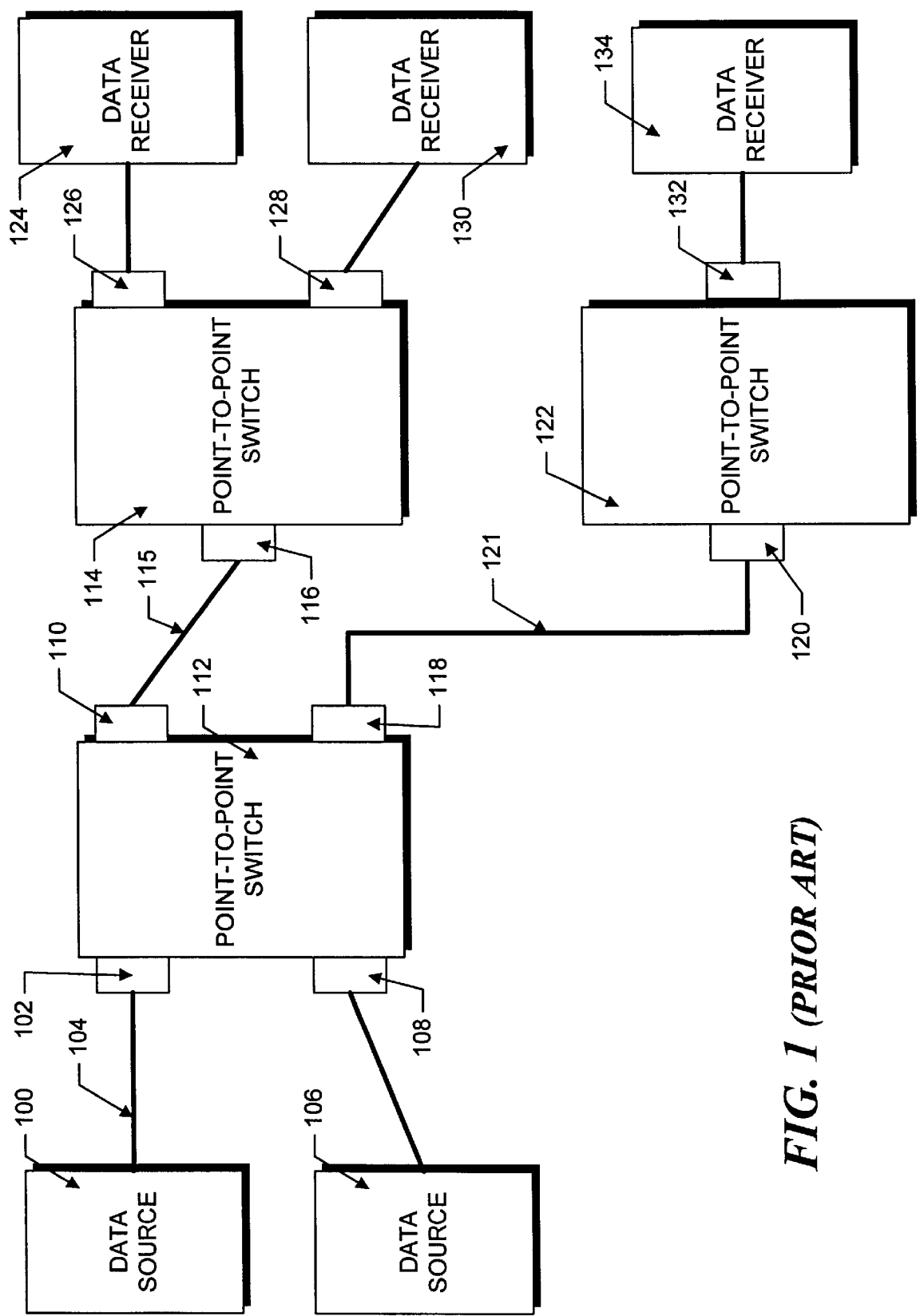
FIG. 1 is a block schematic diagram of a multistage point-to-point switched data configuration.

FIG. 1 illustrates a conventional point-to-point multistage switched data configuration which can use the present invention. In the particular configuration illustrated in FIG. 1, there are three point-to-point switches, 112, 114 and 122. Each of point-to-point switches 112, 114 and 122 is equipped with ports which receive data and which transmit data. For example, switch 112 is equipped with ports 102, 108, 110 and 118. A data source, such as source 100, is connected to input port 102 by means of a data link 104. Similarly, data source 106 is connected to input port 108.

At some point in the data transmission process, generally at the data source 100, a stream of data packets to be transmitted over the switched configuration are broken up into a stream of data cells and these cells are serially transmitted over data link 104 to input port 102. A data cell stream generated by source 106 is transmitted to input port 108. Input ports 102 and 108 can be connected by switch 112 to either or both of output ports 110 and 118.

Switch 112 can, in turn, be connected to switches 114 and 122 by means of further data links. For example, output port 110 on switch 112 can be connected to an input port 116 on switch 114 by means of data link 115. Similarly, output port 118 can be connected to input port 120 of switch 122 by means of data link 121.

In the particular switching configuration shown in FIG. 1, switches 114 and 122 can be connected to a plurality of data receivers 124, 130 and 134. In particular, switch 114 is connected to data receivers 124 and 130 by means of output ports 126 and 128, respectively. In a similar manner, switch 122 is connected to data receiver 134 by means of output port 132. Each data receiver has a mechanism for reassembling the cells transmitted over the switched configuration into data packets which are then transmitted to utilization devices.

The switched configuration illustrated in FIG. 1 is representative of a switched network such as an ATM switching network and is also representative of a multistage switching fabric used in switched bus technology, such as the NGIO technology discussed above. In order to simplify the discussion, the remaining portion of the discussion will focus on the NGIO technology, although it will be clearly understood by those skilled in the art, the principles of the invention are equally applicable to other switched networks as well as switched bus technology.

Figure 2:
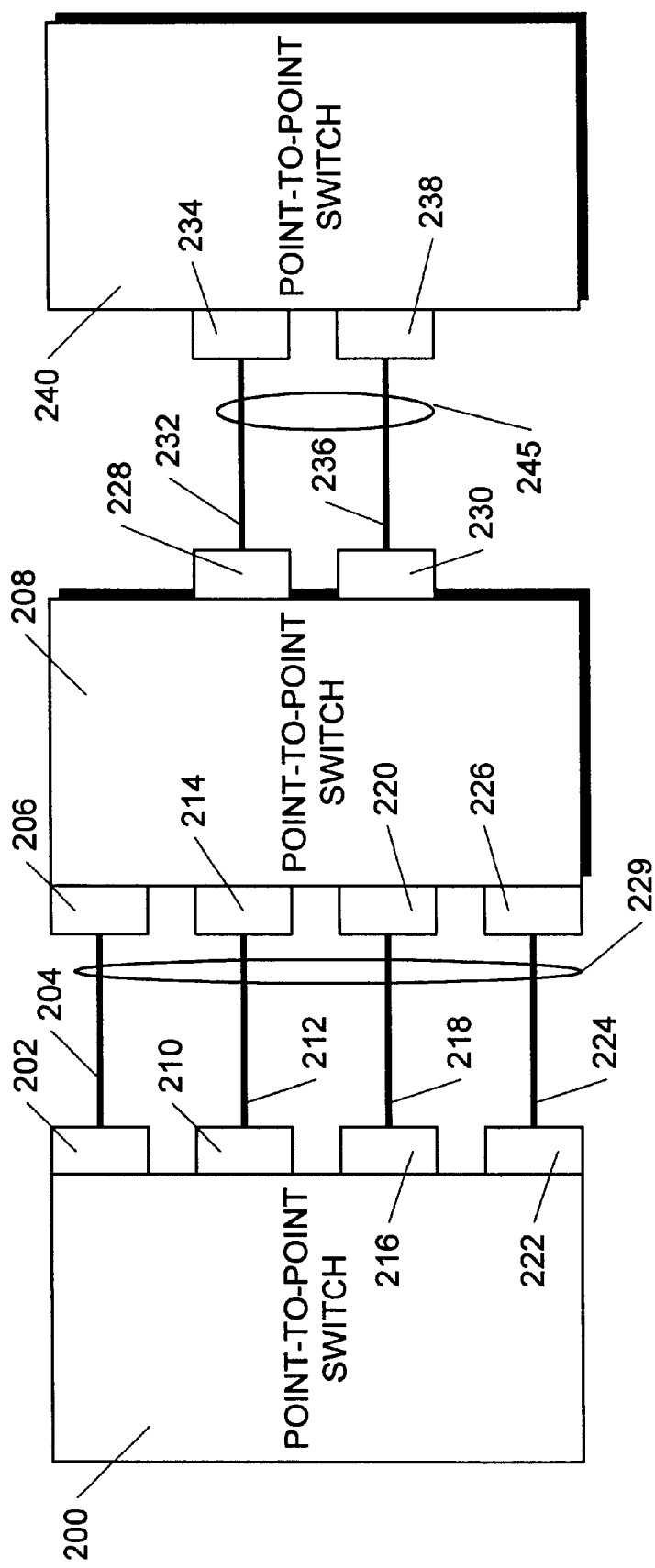
FIG. 2 is a block schematic diagram of two points in the multistage configuration of FIG. 1 illustrating bundling of data transmission links.

In general, the data transfer rate between a data source and a data receiver, for example between data source 100 and switch 112 is limited by the serial data transfer rate of link 104. However, by using an arrangement as illustrated in FIG. 2, called a Multi-link Extension (MLX) configuration in NGIO terms, the effective bandwidth on the data transmission path between a data source and a data receiver can be increased by bundling links together. Data cells which would normally be transmitted sequentially over a single data link are transmitted in parallel over all of the data links in a bundle. The use of bundles allows bandwidth matching between data sources and data receivers, for examples between two switches. In particular, switch 200 is connected to switch 208 by means of four data links. Data link 204 connects output port 202 of switch 200 to input port 206 of switch 208. Similarly, data link 212 connects ports 210 and 214. Data link 218 connects ports 216 and 220 and data link 224 connects ports 222 and 226. Data links 204, 212, 218 and 224 can be associated as a group or "bundle" 229 and data cells which would normally be sent sequentially over a single link can be transmitted in parallel over the four links 204–224 thereby effectively increasing the data transfer rate by a factor of four.

A similar arrangement can be used to increase the bandwidth between switches 208 and 240. In particular, data link 232, which connects ports 228 and 234 and data link 236 which connects ports 230 and 238 can be considered to be a second bundle 245 over which data cells transmitted between switches 208 and 240 can pass in parallel.

Figure 3:
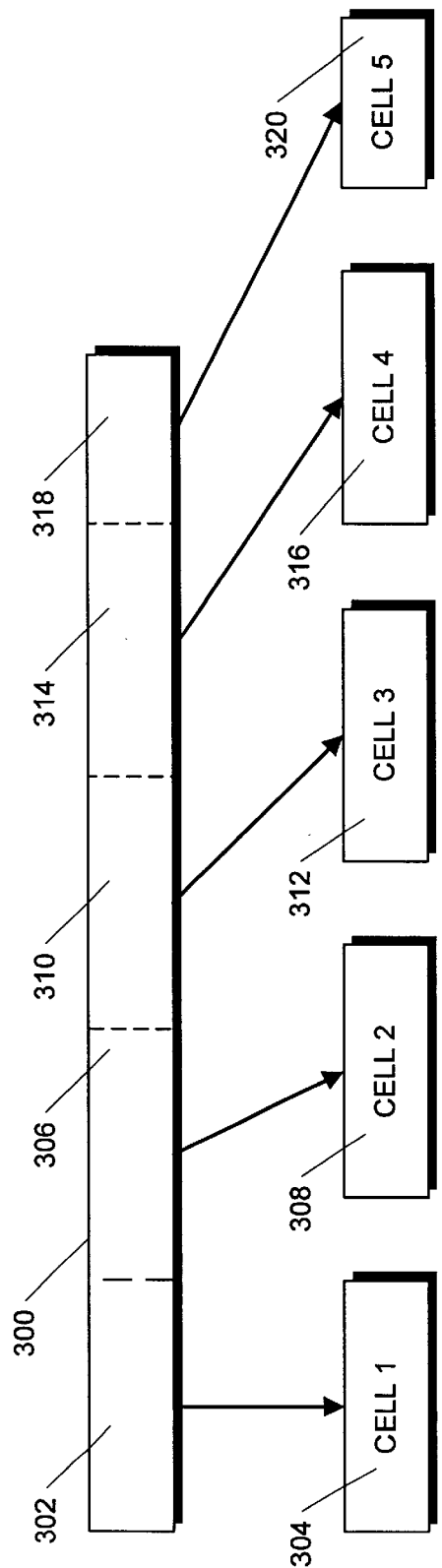
FIG. 3 is a schematic diagram illustrating a prior art partitioning of a data packets into data cells.

As previously mentioned, a data packet is typically partitioned into data cells for transmission over the bundled links discussed above. A conventional technique for partitioning a data packet into data cells is illustrated in FIG. 3. In this illustration, data packet 300 is partitioned into five cells. In accordance with the prior art data partitioning algorithm, data packet 300 is partitioned into sections equal to the size of a maximum sized data cell. Sequential sections are then assigned to sequential data cells. For example, the first section 302 of packet 300 is partitioned and assigned to cell 304. Similarly, section 306 is assigned to cell 308, section 310 is assigned to cell 312 and section 314 is assigned to cell 316. The remainder 318 of data packet 300 is less than the maximum cell size. Accordingly, it is assigned to a partial cell 320 which has a size less than the maximum cell size.

Figure 4:
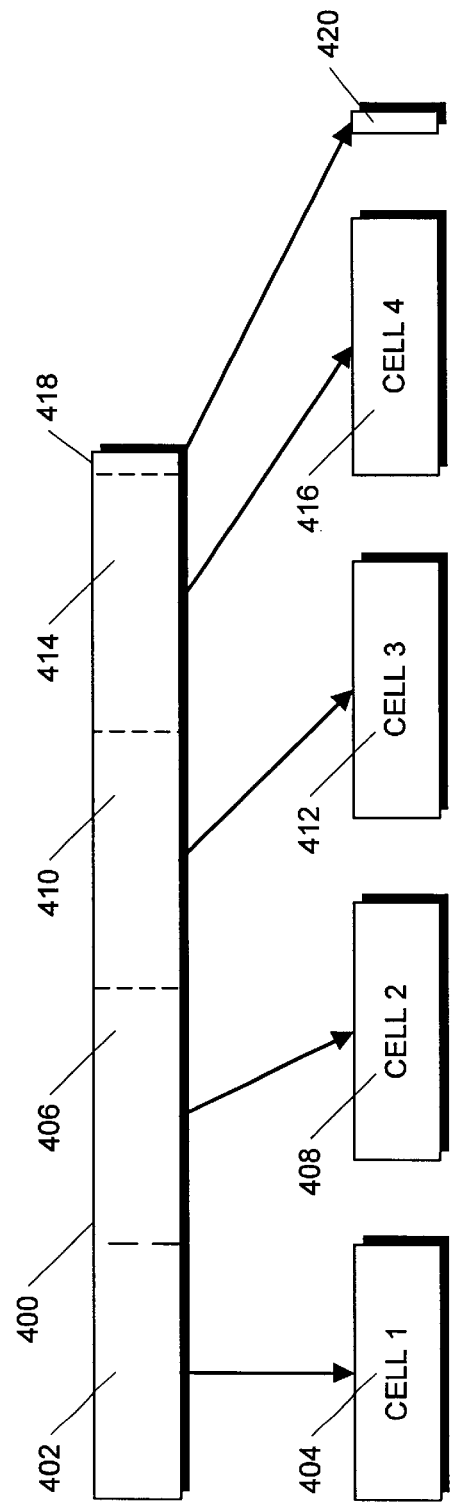
FIG. 4 is a schematic diagram illustrating a prior art partitioning of a data packets into data cells which generates a very short length cell.

In general, this prior art algorithm works well. However, in certain circumstances, the algorithm generates very small data cells. For example, as shown in FIG. 4, data packet 400 is also partitioned into data cells using the aforementioned algorithm. In this case, the first Data packet section 402 is assigned to a cell 404 which has maximum size. Likewise, sections 406, 410, and 414 are assigned to maximum size cells 408, 412 and 416, respectively. However, datapacket 400 has a size that is slightly larger than would be evenly divisible by maximum sized cells. Accordingly, a small portion 418 is left over after cells 408, 412, and 416 have been partitioned and assigned. In some cases, portion 418 may be as small as a single byte. This remaining data must be assigned to a partial cell 420 which accordingly may be only one byte in length. This very small partial cell reduces the overall bandwidth in a bundled link system.

Figure 5:
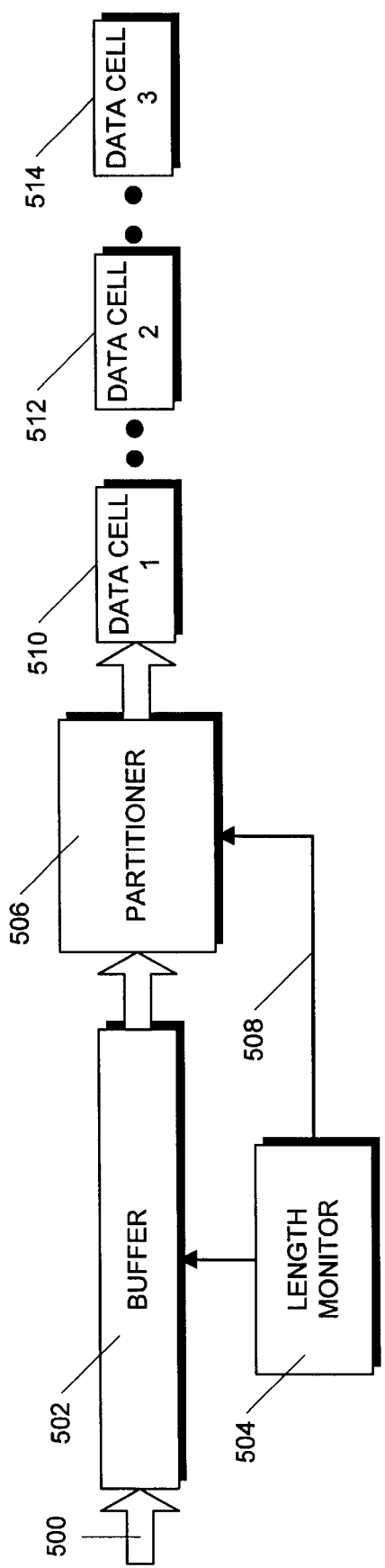
FIG. 5 is a block schematic diagram illustrating a data packet partitioning mechanism in accordance with the principles of the invention.

In accordance with the principles of the invention, in order to overcome this problem, the prior art partitioning mechanism is modified as shown in FIG. 5. Incoming data packets illustrated schematically by arrow 500 are temporarily stored in a buffer memory 502. A length monitor 504 measures the length of the data remaining in buffer 502. The data partitioner 506 reads data from buffer 502 and partitions the data into data cells 510–514. The data partitioner 506 is controlled by the length monitor 504 as indicated schematically by arrow 508 in order to change the conventional partitioning algorithm as explained in detail below with respect to FIGS. 6 and 7.

Figure 6:
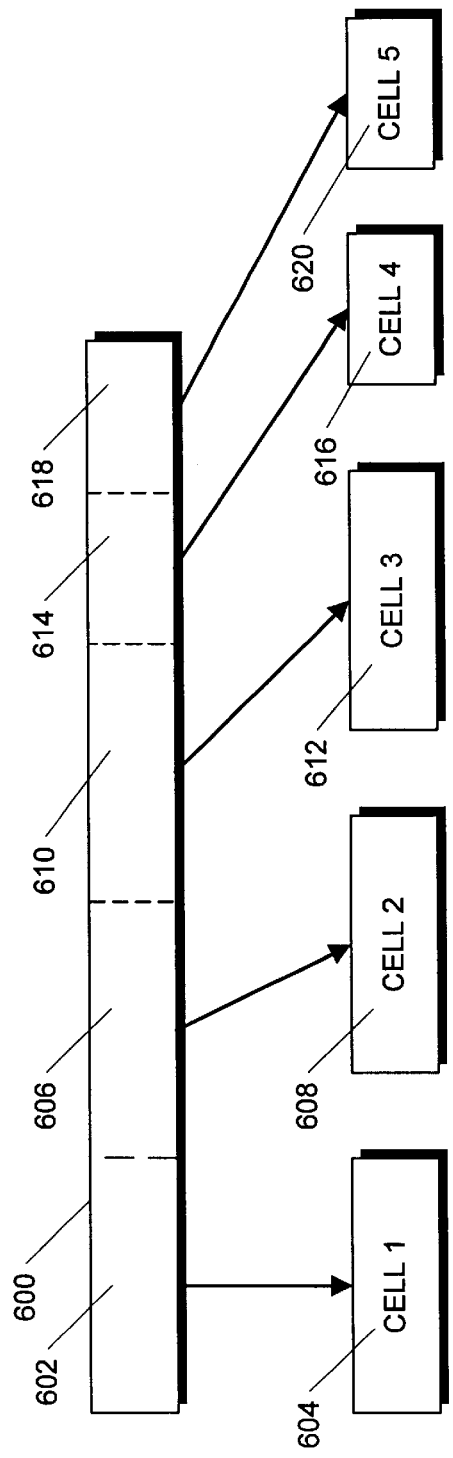
FIG. 6 is block diagram of an arrangement for partitioning a data packet into data cells in accordance with the principles of the present invention.

More particularly, the inventive data partitioning arrangement is illustrated in FIG. 6. In FIG. 6, data packet 600 is divided into cells of maximum cell size until the remaining portion of the data packet data is less than two times the maximum cell size. Thus, section 602 of data packet 600 is assigned to a maximum size cell 604. Similarly, section 606 is assigned to cell 608 and section 610 is assigned to cell 612. However, the remaining data portion of data packet 600 is now less than two times the maximum cell size as determined by the length monitor 504. In this case, assuming that the remaining portion is greater than a single maximum cell size, the remaining data is divided and a portion is assigned to a data cell. Each portion is chosen to prevent data cells smaller than a predetermined size from being generated. In a preferred embodiment, each portion is equal to one half of the remaining data. Thus, section 614 is assigned to partial cell 616 which is equal to one half of the remaining data and section 618 is assigned to partial cell 620. In this case, each data packet ends with two partial cells, each of which holds half of the remaining data. However, in no case is a single byte of data or a very small amount of data assigned to a single cell.

Figure 7:
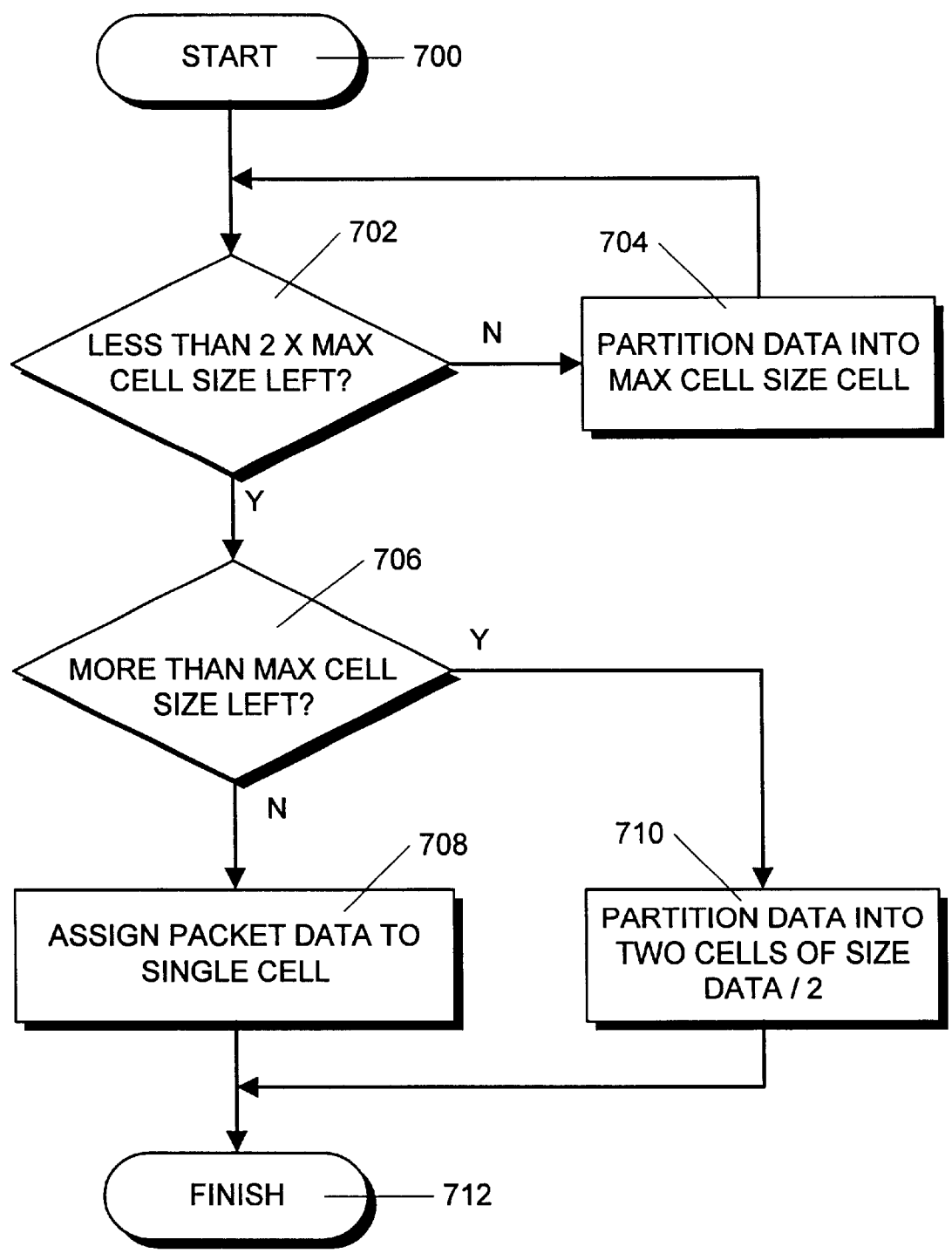
FIG. 7 is a flowchart illustrating the steps in an illustrative process for partitioning a data packet into data cells in accordance with the principles of the present invention.

FIG. 7 is a flowchart that illustrates a routine which can be used to partition a data packet into data cells in accordance with the principles of the invention. The routine starts in step 700 and proceeds to step 702 where a determination is made whether the remaining data in the data packet is less than two times the maximum cell size. If the remaining data is more than two times the maximum cell size, then the data is partitioned into a maximum cell size cell in step 704 and returns to step 702.

Alternatively, if, in step 702, a determination is made that the remaining data is less than two times the maximum cell size, the routine proceeds to step 706 where a determination is made whether the remaining data is more than the maximum cell size. If so, the routine proceeds to step 710 where the remaining data is partitioned into two cells of equal size, both accommodating one half of the remaining data. The routine then finishes in step 712.

Alternatively, if, in step 706, the remaining data is less than the maximum cell size, then the remaining data is assigned to a single cell in step 708. In any case, the routine finishes in step 712.

In order to determine the effect that the inventive partitioning arrangement has on improving link bandwidth, simulations were performed using sample workloads. When typical Ethernet data streams were used with predetermined distributions of packet sizes, performance improved by approximately three percent. However, for worst case workload situation, such as that illustrated in FIG. 4, performance improved by a factor of two.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. Apparatus for alleviating cell packing problems in a bundled link system which partitions a data packet into varying size cells, each cell having a maximum size, the apparatus comprising:

a length monitor which determines the size of unpartitioned data in the data packet; and a partitioner which, under control of the length monitor, divides the data packet into sections each having a size equal to the maximum cell size when the unpartitioned data has a size more than the data required to fill two maximum size cells and which divides the unpartitioned data into two sections, each of which has a size that is at least a predetermined minimum size, when the unpartitioned data has a size less than the data required to fill two maximum size cells wherein the predetermined minimum size is substantially one half the unpartitioned data.

2. Apparatus according to claim 1 wherein the partitioner assigns the data to a single data cell when the unpartitioned data has a size less than the data required to fill a single maximum size cell.

3. Apparatus according to claim 1 wherein the partitioner assigns each section to a data cell.

4. Apparatus according to claim 1 wherein the partitioner assigns sequential sections to sequential data cells.

5. A method for alleviating cell packing problems in a bundled link system which partitions a data packet into varying size cells, each cell having a maximum size, the method comprising:

(a) determining the size of unpartitioned data in the data packet;

(b) dividing the data packet into sections each having a size equal to the maximum cell size when the unpartitioned data has a size more than the data required to fill two maximum size cells; and (c) dividing the unpartitioned data into two sections, each of which has a size that is at least a predetermined minimum size, when the unpartitioned data has a size less than the data required to fill two maximum size cells wherein the predetermined minimum size is substantially one half the unpartitioned data.

6. A method according to claim 5 further comprising:

(c) assigning the data to a single data cell when the unpartitioned data has a size less than the data required to fill a single maximum size cell.

7. A method according to claim 5 further comprising (d) assigning each section to a data cell.

8. A method according to claim 5 wherein step (e) comprises:

(e1) assigning sequential sections to sequential data cells.

9. A computer program product for alleviating cell packing problems in a bundled link system which partitions a data packet into varying size cells, each cell having a maximum size, the computer program product comprising a computer usable medium having computer readable program code thereon including:

program code for determining the size of unpartitioned data in the data packet;

program code for dividing the data packet into sections each having a size equal to the maximum cell size when the unpartitioned data has a size more than the data required to fill two maximum size cells; and program code for dividing the unpartitioned data into two sections, each of which has a size that is at least a predetermined minimum size, when the unpartitioned data has a size less than the data required to fill two maximum size cells wherein the predetermined minimum size is substantially one half the unpartitioned data.

10. A computer program product according to claim 9 further comprising:

program code for assigning the data to a single data cell when the unpartitioned data has a size less than the data required to fill a single maximum size cell.

11. A computer program product according to claim 9 further comprising:

program code for assigning each section to a data cell.

12. A computer program product according to claim 9 wherein the program code for assigning each section to a data cell comprises program code for assigning sequential sections to sequential data cells.

* * * * *